(12) United States Patent  (10) Patent No.: US 9,333,891 B2
Sitzler et al.  (45) Date of Patent: May 10, 2016

(54) RECEIVING DEVICE FOR AT LEAST ONE BOTTLE OR CUP CONTAINER IN A VEHICLE INTERIOR

(71) Applicants: Wolfgang Sitzler, Wuppertal (DE); Hartmut Bohlke, Wuppertal (DE); Juergen Salewski, Duesseldorf (DE); Andreas Goebbels, Kuerten (DE); Wolfram Zummack, Trolsdorf (DE)

(72) Inventors: Wolfgang Sitzler, Wuppertal (DE); Hartmut Bohlke, Wuppertal (DE); Juergen Salewski, Duesseldorf (DE); Andreas Goebbels, Kuerten (DE); Wolfram Zummack, Trolsdorf (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/400,977

(22) PCT Filed: May 15, 2013

(86) PCT No.: PCT/EP2013/060091

§ 371 (c)(1),
(2) Date: Nov. 13, 2014

(87) PCT Pub. No.: WO2013/171282

PCT Pub. Date: Nov. 21, 2013

(65) Prior Publication Data

US 2015/0165952 A1   Jun. 18, 2015

(30) Foreign Application Priority Data

May 16, 2012 (DE) .......................... 10 2012 208 278

(51) Int. Cl.
*B60N 3/10*  (2006.01)

(52) U.S. Cl.
CPC ...................... *B60N 3/102* (2013.01)

(58) Field of Classification Search
CPC .......... B60N 3/10; B60N 3/102; B60N 3/103; B60N 3/105–3/108; A47G 23/02; A47G 23/0308

USPC ................... 296/24.34, 37.8, 37.12; 224/926
See application file for complete search history.

(56) References Cited

U.S. PATENT DOCUMENTS 6,065,729 A * 5/2000 Anderson .............. B60N 3/102
  224/282
6,427,960 B1 * 8/2002 Gehring ............... B60N 2/4686
  224/926

(Continued)

FOREIGN PATENT DOCUMENTS

DE   20 2005 003 638 U1   6/2005
DE   20 2005 004 258 U1   6/2005

(Continued)

OTHER PUBLICATIONS

Form PCT/ISA/220 Notification of Transmittal of International Search Report issued in Application No. PCT/EP2013/060091 dated Jul. 10 2013 (1 page).

(Continued)

*Primary Examiner* — Gregory Blankenship
(74) *Attorney, Agent, or Firm* — Flynn, Thiel, Boutell & Tanis, P.C.

(57) ABSTRACT

Such a receiving device with a receiving region and also with a holding frame liftably mounted relative to the receiving region, and with a cover articulated on the receiving region for closing and opening the receiving region, wherein the cover and the holding frame are coupled to one another by means of a positive guide at least over a part of their movement paths, is known. According to the invention, the positive guide has a control mechanism which is mounted on the receiving region and which is coupled to the cover and to the holding frame so as to transmit movement, and a blocking device is provided for an extended functional position of the holding frame. Use for passenger cars.

6 Claims, 15 Drawing Sheets

(56) References Cited

U.S. PATENT DOCUMENTS

| | | | | |
|---|---|---|---|---|
| 6,439,525 | B1* | 8/2002 | Gehring | B60N 2/4686 224/926 |
| 7,757,888 | B2* | 7/2010 | Ogura | B60N 3/102 220/345.1 |
| 7,891,623 | B2* | 2/2011 | Haddad | B60N 3/102 224/926 |
| 8,474,772 | B2* | 7/2013 | Miklas | B60N 3/102 220/737 |
| 8,757,571 | B2* | 6/2014 | Shimajiri | B60N 3/102 224/282 |
| 8,919,847 | B2* | 12/2014 | Mather | B60R 7/04 296/24.34 |
| 2004/0069792 | A1 | 4/2004 | Schaal | |
| 2006/0066188 | A1* | 3/2006 | Crawford | E04B 9/003 312/247 |
| 2008/0290125 | A1* | 11/2008 | Lee | B60N 3/101 224/483 |
| 2009/0224564 | A1* | 9/2009 | O'Brien | B60N 2/4686 296/37.8 |
| 2011/0095556 | A1* | 4/2011 | Werner | B60N 3/105 296/24.34 |
| 2011/0259906 | A1* | 10/2011 | Shimajiri | B60N 3/102 220/737 |
| 2012/0056063 | A1* | 3/2012 | Shimajiri | B60N 3/106 248/311.2 |
| 2013/0038097 | A1* | 2/2013 | Oldani | B60N 3/102 297/188.14 |
| 2013/0057011 | A1* | 3/2013 | Yamagishi | B60R 7/04 296/24.34 |
| 2014/0300125 | A1* | 10/2014 | Brinas | B60R 7/04 296/24.34 |
| 2015/0165952 | A1* | 6/2015 | Sitzler | B60N 3/102 296/37.8 |

FOREIGN PATENT DOCUMENTS

| | | |
|---|---|---|
| DE | 10 2007 013 981 A1 | 9/2008 |
| EP | 1 380 466 B1 | 1/2004 |
| JP | 2000-272401 A | 10/2000 |

OTHER PUBLICATIONS

Form PCT/ISA/210 International Search Report issued in Application No. PCT/EP2013/060091 with English translation dated Jul. 10, 2013 (5 pages).

Form PCT/ISA/237 Written Opinion of International Searching PCT/EP2013/060091 dated Jul. 10, 2013 (6 pages).

Examination Report of German Patent Office issued in Application No. 10 2012 208 278.6 dated Jan. 18, 2013 (6 pages).

* cited by examiner

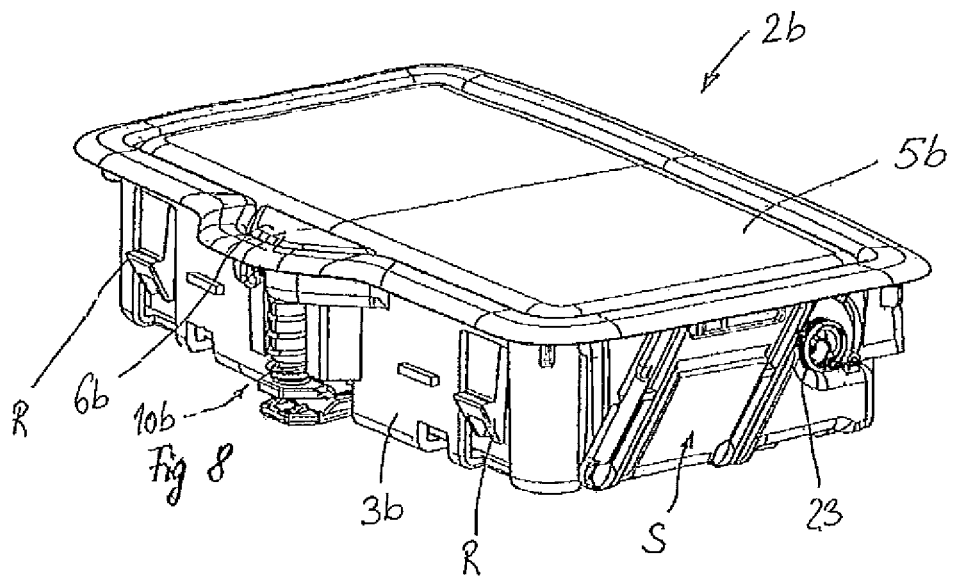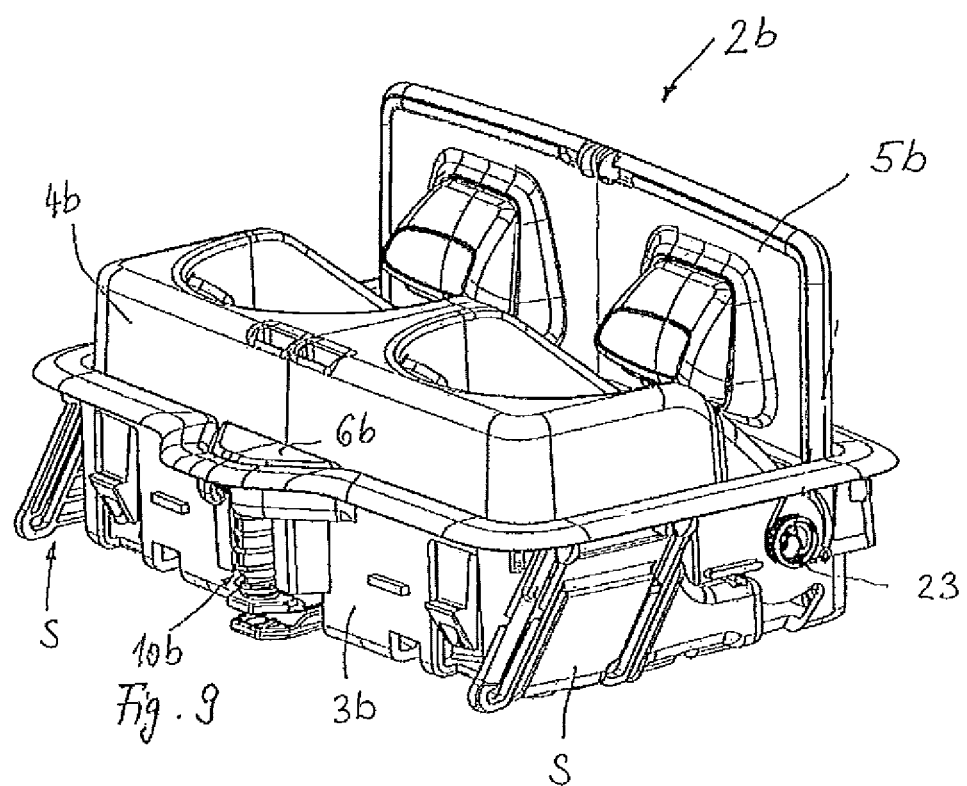

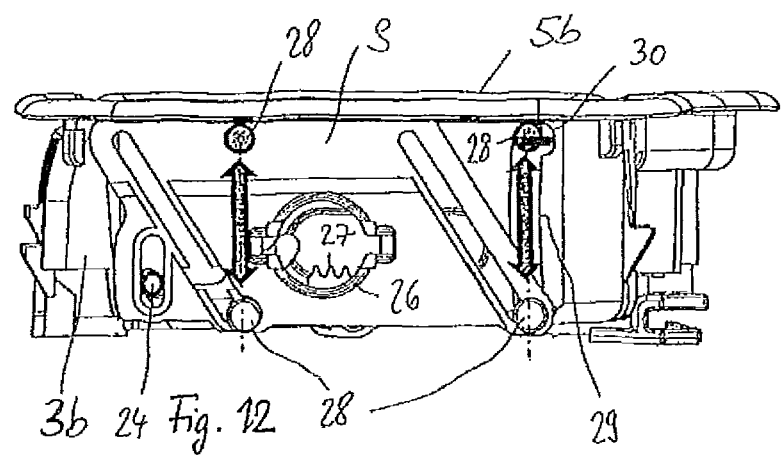
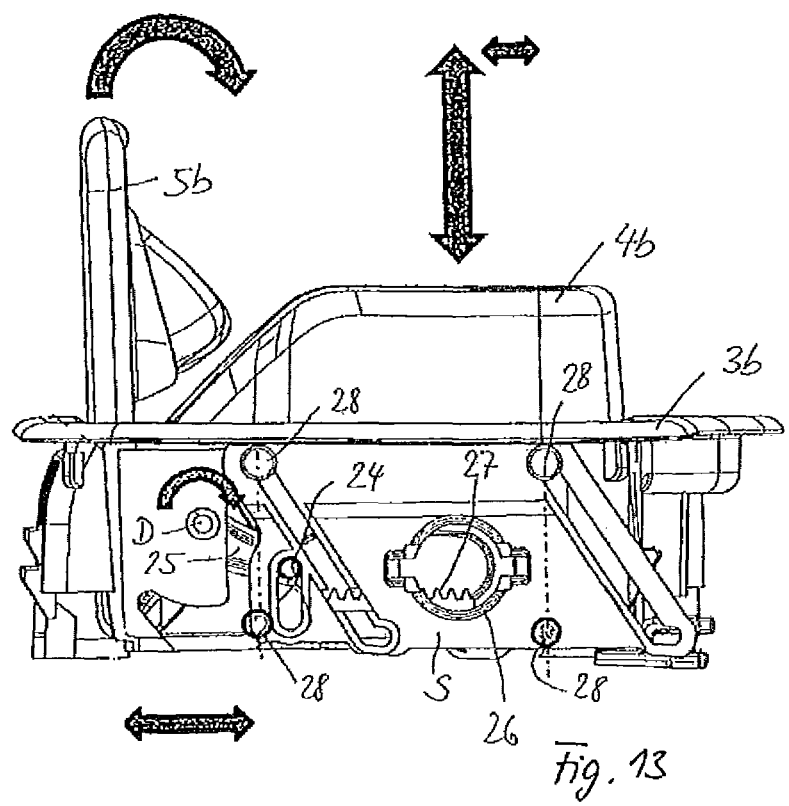

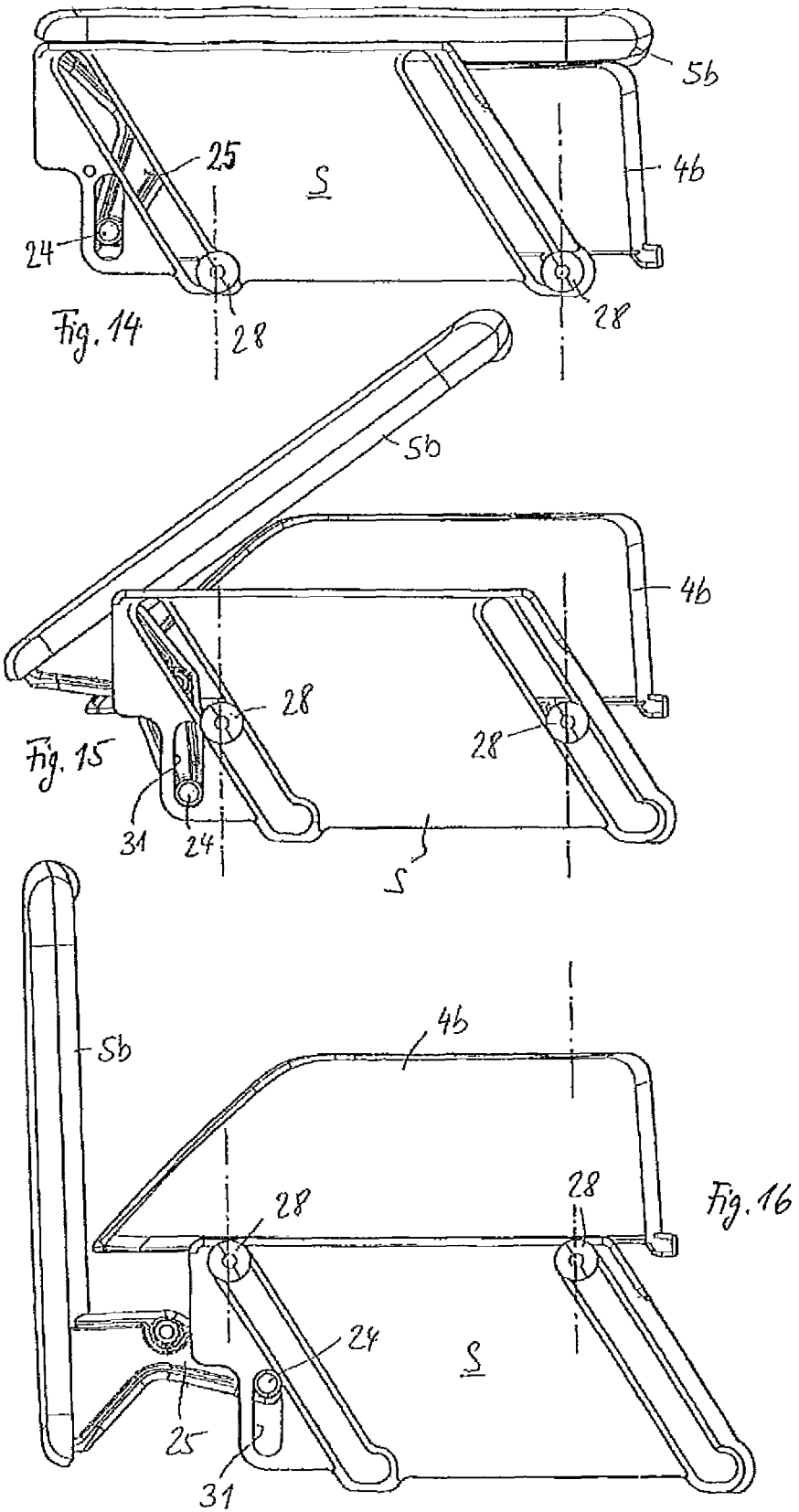

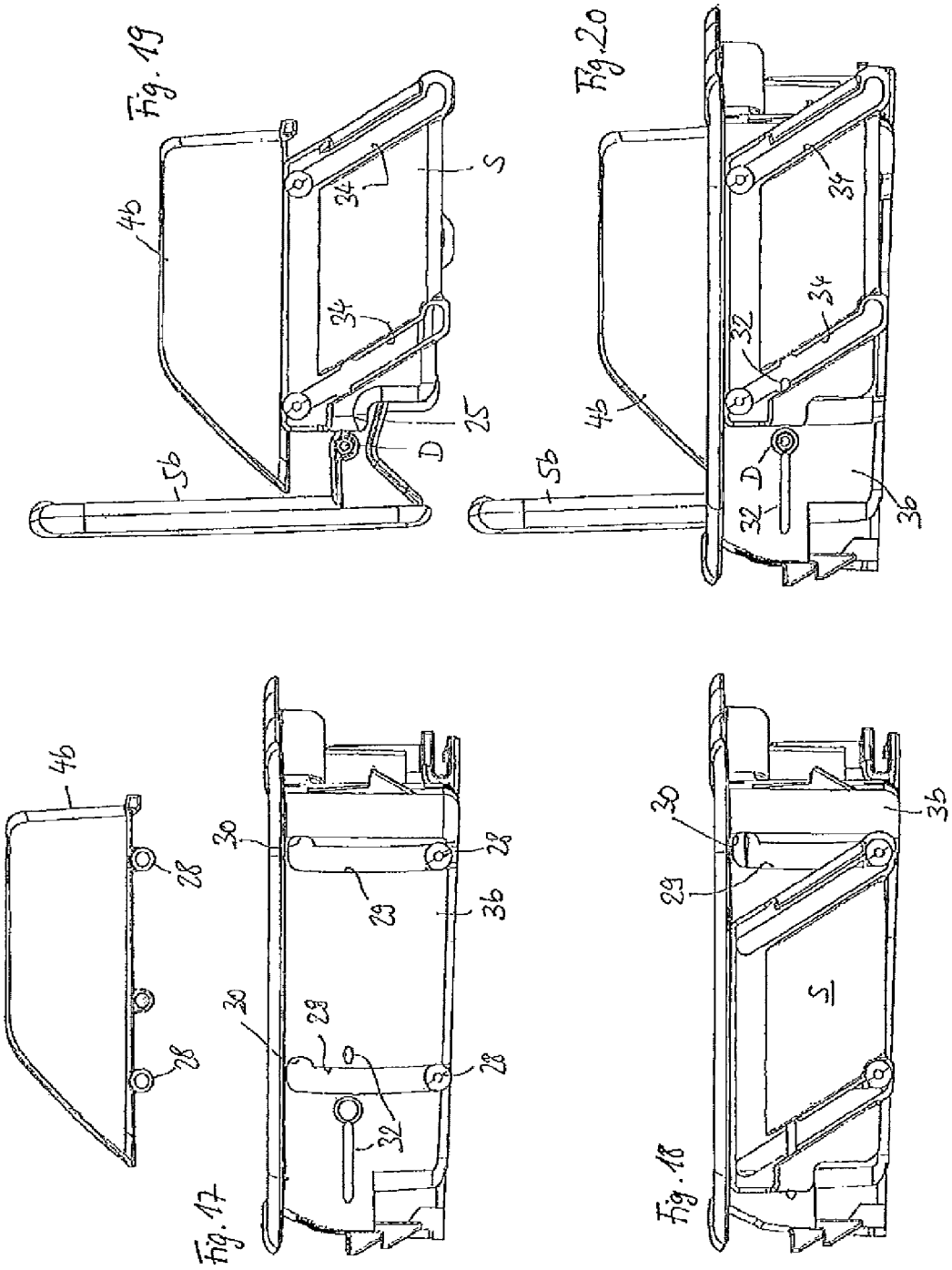

RECEIVING DEVICE FOR AT LEAST ONE BOTTLE OR CUP CONTAINER IN A VEHICLE INTERIOR

FIELD OF THE INVENTION

The present invention relates to a receiving device for at least one bottle or cup container in a vehicle interior, with a receiving region and with a holding frame which is mounted liftably relative to the receiving region, and with a cover, which is articulated on the receiving region, for closing and opening up the receiving region, wherein the cover and the holding frame are coupled to each other over at least part of their movement path by means of a positive guide.

BACKGROUND OF THE INVENTION

A receiving device of this type is known from EP 1380466 B1. The known receiving device is provided for installing in a central console of a vehicle interior. The known receiving device has a cup-shaped receiving region which is arranged fixedly in the central console. An annular holding frame is mounted in a liftably displaceable manner within the receiving region. The holding frame is shifted between its lower rest position, in which said holding frame is arranged lowered in the receiving region, and an upper functional position, in which said holding frame serves for laterally supporting a corresponding bottle or cup container, by means of a positive guide which is coupled to the pivotability of a cover. The cover serves to close the receiving region in the downwardly lowered rest position of the holding frame. When the cover is opened, the holding frame is inevitably raised at the same time via the positive guide. The positive guide is defined, on the one hand, by a control pin arranged on the cover and, on the other hand, by a cam path which is formed by a slotted guide in the wall of the holding frame, wherein the pin is guided in the slotted guide during a standing-up or closing movement of the cover and brings about a corresponding lifting or lowering movement of the holding frame.

SUMMARY OF THE INVENTION

It is the object of the invention to provide a receiving device of the type mentioned at the beginning, which permits simple handling and a functionally reliable receiving of at least one bottle or cup container.

The object is achieved for a receiving device of the type mentioned at the beginning in that the positive guide has a control mechanism which is mounted on the receiving region and is coupled to the cover and to the holding frame so as to transmit movement, and in that a blocking device is provided for an extended functional position of the holding frame. The solution according to the invention is suitable both for receiving devices which are arranged in a stationary manner in the vehicle interior, in particular in the region of a central console, and for receiving devices which are arranged in movable parts of the vehicle interior, such as, in particular, in the region of a movable arm rest between front-side seats or in the region of a backrest arrangement of a rear seat bench, said arm rest serving, in the pivoted-upward position, as part of the backrest arrangement of the rear seat bench. The receiving device can also be provided at a different location in the vehicle interior that is suitable for the depositing of bottle or cup containers by vehicle occupants. The solution according to the invention is provided in a particularly advantageous manner for the vehicle interior of a passenger vehicle. However, it can also be provided in the vehicle interior of commercial vehicles or trucks or else in the vehicle interior of rail vehicles.

The blocking device acts in an interlocking manner in the vertical direction and blocks a lowering movement of the holding frame downward in the extended functional position. The blocking device serves to support the holding frame in the extended functional position in order to avoid a bottle or cup container that is to be inserted into the holding frame unintentionally pushing the holding frame downward. The control mechanism brings about a positive control over the entire movement path of the holding frame and of the cover relative to the receiving region.

In a refinement of the invention, a guide mechanism for the liftable shifting of the holding frame relative to the receiving region is provided, and the guide mechanism comprises, at an upper end region, a transverse guide which is limited to a short path and transversely shifts the holding frame, after the latter has reached an upper end position, away from the cover. The transverse guide serves as a blocking device for supporting the holding frame in the transversely shifted end position, which corresponds to the extended functional position, against a lowering of the holding frame downward. In addition, the transverse guide can be assigned a supporting section on the receiving region, said supporting section supporting the holding frame in the transversely shifted end position downward in an interlocking manner.

In a further refinement of the invention, the control mechanism comprises at least one control body which is guided on the receiving region and is shiftable relative to the receiving region and is coupled to the holding frame. The control body is part of the control mechanism. The control body can be of single- or multi-part design and preferably has guide profilings which interact with complementary guide profilings on the receiving region. In addition, the control body is assigned further guide profilings which are coupled to complementary guide profilings of the holding frame.

In a further refinement of the invention, a direction of movement of the control body differs from a lifting direction of movement of the holding frame. In an advantageous manner, the control body is mounted movably on the receiving region transversely or obliquely with respect to a lifting direction of movement of the holding frame.

In a further refinement of the invention, a damping unit for damping shifting movements of the control body is provided. Owing to the positive coupling of the control body both to the holding frame and to the receiving region, the damping unit ensures a uniform opening or closing movement of the cover and a uniform lifting or lowering movement of the holding frame. Stop noises in end positions of the cover and of the holding frame can thereby be avoided or reduced. The cover is raised from its closed position preferably by the cover being unlocked and by a spring force acting on the cover. The at least one control body and the holding frame are inevitably moved at the same time. A closing movement of the cover takes place manually by corresponding forces applied by an operator's hand. Owing to the positive coupling to the at least one control body and the holding frame, control body and holding frame are inevitably also returned into the rest position.

The object on which the invention is based is also achieved in that the holding frame is acted upon upward in the lifting direction by a lifting drive in the form of a lifting spring arrangement, in that the positive guide is designed in such a manner that, during a closing movement of the cover, the holding frame is transferrable from its upper holding position into a lower rest position, and in that the cover is assigned releasable locking means in order to lock the cover in its closed position. The lifting drive in the form of the lifting spring arrangement is preferably effective permanently, and therefore the locking of the cover in its closed position also brings about the securing of the holding frame in its lower rest position. The holding frame is assigned a stop for an upper end position, said stop preventing the holding frame from being pushed upward out of the lifting guides by the lifting spring arrangement when the cover is open. The lifting spring arrangement preferably comprises a plurality of helical compression springs which are oriented in the lifting direction and are supported on the receiving region, on the one hand, and on a lower side of the holding frame, on the other hand.

In a refinement of the invention, the positive guide comprises at least one tension means which connects the liftable holding frame to the pivotably mounted cover so as to transmit movement. The at least one tension means is preferably deflected on the stationary receiving region in such a manner that a pivoting movement of the cover brings about a liftable shifting of the holding frame. The at least one tension means acts on the cover, on the one hand, and on the holding frame, on the other hand. When the cover is closed, the at least one tension means is subject to tensile loading. The at least one tension means acts from below on the holding frame and exerts a tensile force on the holding frame in the opposite direction to the compressive force of the lifting spring arrangement. The cover is preferably pivoted by hand from its open position into the closed position. The manually applied torque exerts a tensile force on the at least one tension means, said tensile force being of a size sufficient in order to overcome the counterforce of the lifting spring arrangement. A tension cable, a tension strap or a similarly designed tension strand is preferably provided as the tension means.

In a further refinement of the invention, the positive guide comprises mutually corresponding control profilings on the cover, on the one hand, and on the holding frame, on the other hand, said control profilings bearing against each other for transferring the cover into its closed position and of the holding frame into its lower rest position. In this refinement, the cover, on being transferred into the closed position, inevitably pushes the holding frame downwards into its rest position lowered in the receiving region. In an advantageous manner, the cover is mounted pivotably. In the opening position of the cover, the cover advantageously at least partially protrudes upward over an upper side of the holding frame into its upper functional position. As a result, during a pivoting movement of the cover downward, a sufficient force can advantageously be exerted on the holding frame in order to push the holding frame downward counter to the lifting force of the lifting spring arrangement.

In an advantageous manner, at least one control cam is provided on a lower side of the cover as a control profiling in the region of the cover. The holding frame has, as corresponding control profiling, a control surface, which faces the cover, in the region of its outer contour. The at least one control cam comes to bear against said control surface as soon as a corresponding pivoting movement of the cover from the open release position in the direction of its closed position is initiated.

BRIEF DESCRIPTION OF THE DRAWINGS

FIG. 8 shows a further embodiment of a receiving device according to the invention in the closed rest position, FIG. 9 shows the receiving device according to FIG. 8 in the open functional position, FIG. 12 shows a side view of the receiving device according to FIG. 8, FIG. 13 shows a side view of the open position of the receiving device according to FIG. 9, FIG. 14 schematically shows a partial illustration of the receiving device according to FIG. 8, FIG. 15 schematically shows the partial illustration according to FIG. 14 in a half-open intermediate position, FIG. 16 shows the partial illustration according to FIGS. 14 and 15 in an open end position, FIG. 17 shows, in an exploded illustration, a receiving region and a holding frame of the receiving device according to FIGS. 8 and 9, FIG. 18 shows a schematic side view similar to FIG. 12, FIG. 19 shows schematically an illustration of the receiving device according to FIG. 13 with the receiving region omitted, FIG. 20 shows a schematic illustration of the receiving device similar to FIG. 13, FIGS. 21 to 23 show the receiving device according to FIGS. 8 to 20 with a schematic illustration also of invisible lines of guide profilings between receiving region, holding frame and control body.

DETAILED DESCRIPTION

Figure 1:
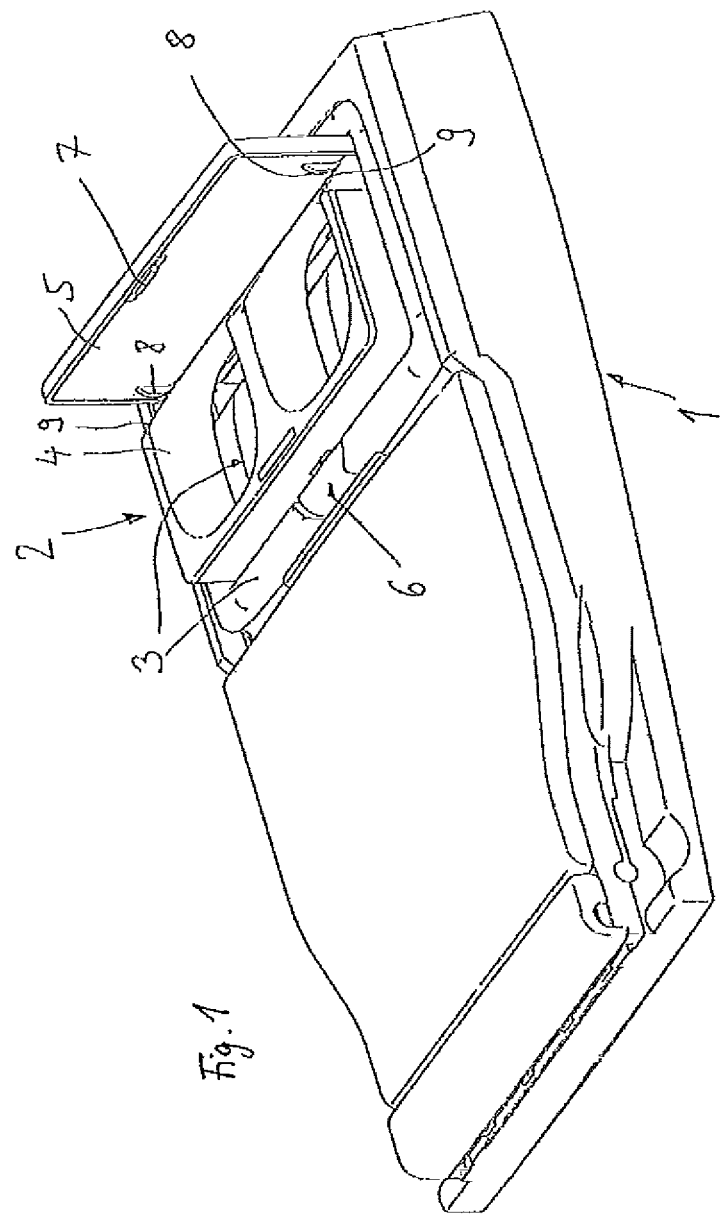
FIG. 1 shows, in a perspective illustration, an embodiment of a receiving device according to the invention in the region of a central console of a vehicle interior.
Figure 2:
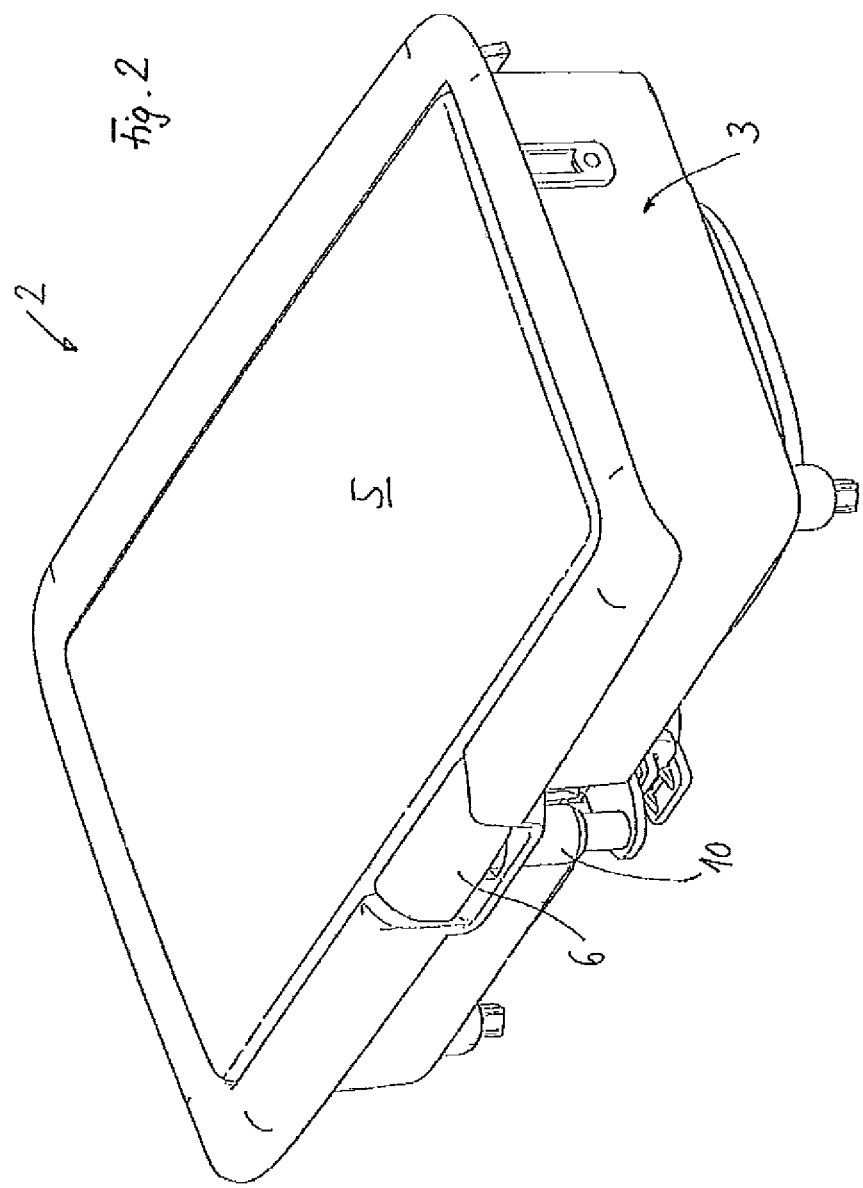
FIG. 2 shows, in an enlarged illustration, the receiving device according to FIG. 1 with the cover closed.

The interior of a passenger vehicle has, between the driver's side and passengers side or else in the region of a rear seat bench, a central arm rest 1 in which a receiving device 2 for two bottle or cup containers according to FIGS. 1 to 5 is arranged. According to FIG. 1, the lower side of the central arm rest 1 can be provided with padding in order, in the upwardly pivoted functional position, to be integrated into a backrest arrangement of the rear seat bench and, with said padding, to form part of the backrest arrangement. The arrangement of further embodiments of receiving devices according to the invention according to FIGS. 6 to 31 corresponds to the arrangement and accommodating of the receiving device 2, as is illustrated and described with reference to FIG. 1.

The receiving device 2 has a dimensionally stable, housing-like receiving region 3 which is accommodated lowered in a corresponding frame section of the central arm rest 1. The receiving region 3 is provided at the bottom with a supporting base 11 on which corresponding bottle or cup containers can be deposited. The supporting base 11 can be of dimensionally stable or flexible, in particular elastically and soft design, in order to obtain damping for deposited containers. The receiving region 3 is open upward and is closeable by a cover 5 mounted pivotably on the receiving region 3. The cover 5 is mounted pivotably about a pivot axis A, which is oriented transversely with respect to a central longitudinal axis of the central arm rest 1, on the receiving region 3, which forms a substantially trough-shaped housing for the receiving device 2. The receiving region 3 surrounds a cuboidal receiving space which is open upward and in which a holding frame 4, which is provided with an approximately rectangular area, is liftably mounted. The receiving space of the receiving region 3 is closeable by the cover 5 which is mounted pivotably in the region of a longitudinal side of the receiving space. In a closed position (FIG. 4), an upper side of the cover 5 ends approximately flush with an upper side of the receiving region 3 and with an upper side of the central arm rest 1. In the open release position of the cover 5, the cover 5 is pivoted upward by approximately 90° relative to its closed position, and therefore the cover 5 bears in a substantially vertically oriented manner against a longitudinal border of the receiving opening of the receiving region 3 (see FIGS. 1, 3 and 5). The cover 5 is locked releasably in the closed position by means of a locking unit 6, 10. The locking unit 6, 10 is transferable by means of a push-push mechanism into a locking position or a release position for releasing the cover 5. In addition, in the region of the cover 5, the locking unit comprises a latching element 7 with which the locking unit 6, 10 interacts.

The holding frame 4 is provided with two annular receiving sections which serve for laterally securing and supporting one bottle or cup container each. The holding frame 4 is formed integrally as a shaped plastic part and is mounted in an approximately vertically movable manner linearly in the lifting or lowering direction relative to the receiving space with the aid of linear guides 12 to 15. For this purpose, the receiving region 3 is provided with hollow profile guides 14, 15 which protrude upward in the manner of columns and into which downwardly protruding guide webs 12, 13 of the holding frame 4 linearly protrude. The liftability of the holding frame 4 is assisted by a lifting drive in the form of a lifting spring arrangement 16, wherein the lifting spring arrangement is provided in the region of at least two spaced-apart, column-shaped hollow profile sections 15 each having a helical compression spring 16 coaxially surrounding the corresponding hollow profile section 15. Each helical compression spring of the lifting spring arrangement 16 is supported on the bottom side on the receiving region 3 and on the top side on an inner side of the holding frame 4, and therefore the lifting spring arrangement 16 permanently pressurizes the holding frame 4 upward in the lifting direction.

Figure 5:
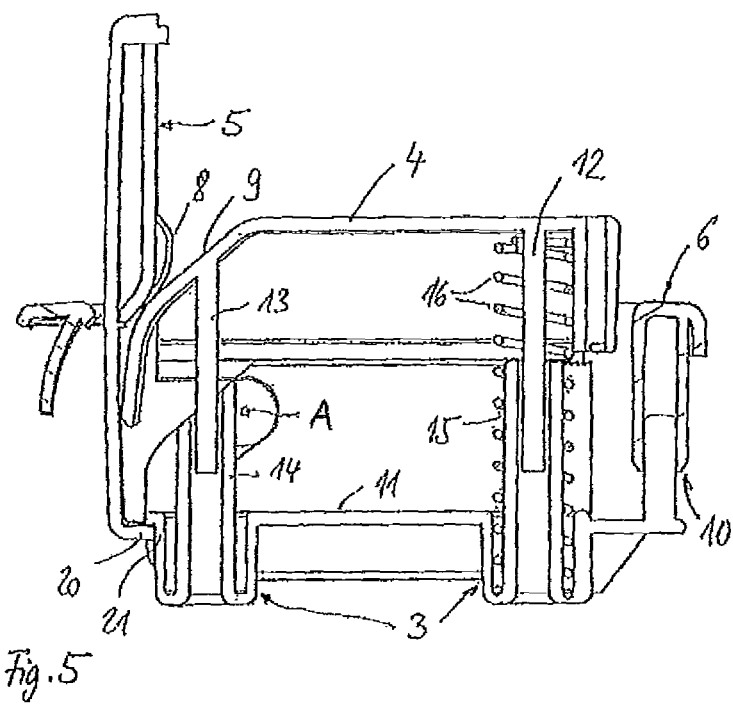
FIG. 5 shows the receiving device according to FIG. 4 in a sectional illustration with the cover open.

When the cover 5 is open, the holding frame 4 is therefore pushed upward by the lifting spring arrangement 16 according to FIG. 5 as far as an end stop. In the exemplary embodiment illustrated, said end stop is formed by the cover 5 which is provided, in the region of the inner side thereof, with at least one supporting cam 8 against which a supporting surface 9 in the region of an upper outer contour of the holding frame 4 comes to bear in the upper end position of the holding frame 4.

The pivotability of the cover 5 is limited on a lower end region of the receiving region 3 by an end stop 21 against which a lower longitudinal border 20 of the cover 5 strikes in the open release position of the cover 5. When the control surface 9 encounters the at least one control cam 8, the cover 5, because of its support in the region of the longitudinal border 20 and of the supporting stop 21, can therefore no longer be pivoted further, and therefore the cover 5, which is supported in the open release position according to FIG. 5, also forms a reliable support against a further, upward extension of the holding frame 4.

In addition or as an alternative, the holding frame 4 can be provided, in the region of its lifting guides 12 to 15 themselves, with at least one corresponding end stop which prevents the holding frame 4 from exceeding a predetermined lifting path upward.

Figure 3:
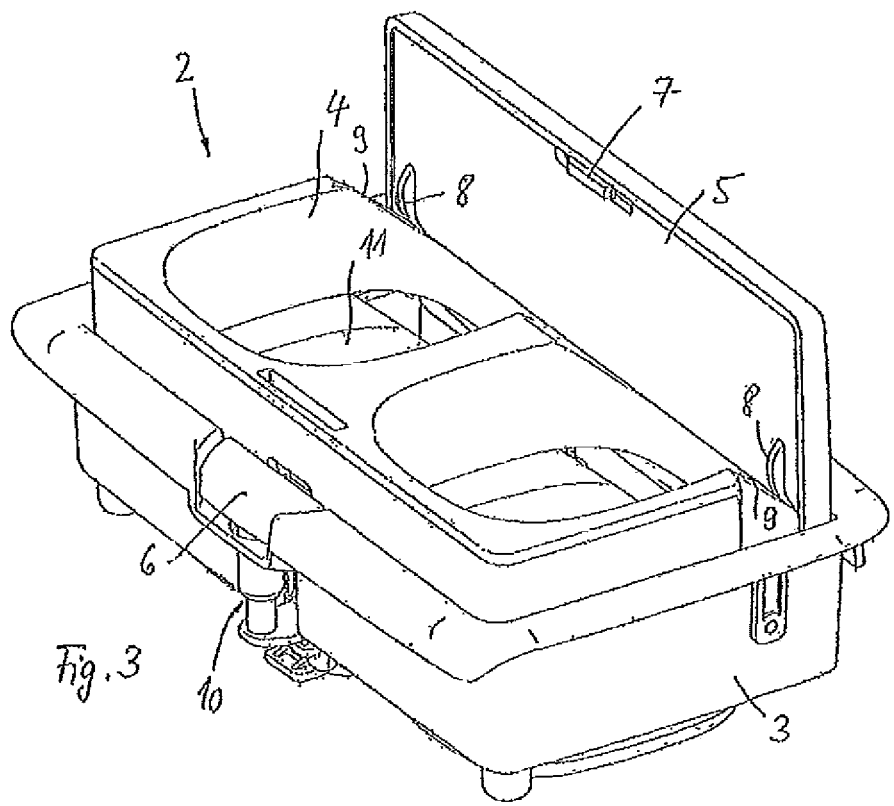
FIG. 3 shows the receiving device according to FIGS. 1 and 2 with the cover open.
Figure 4:
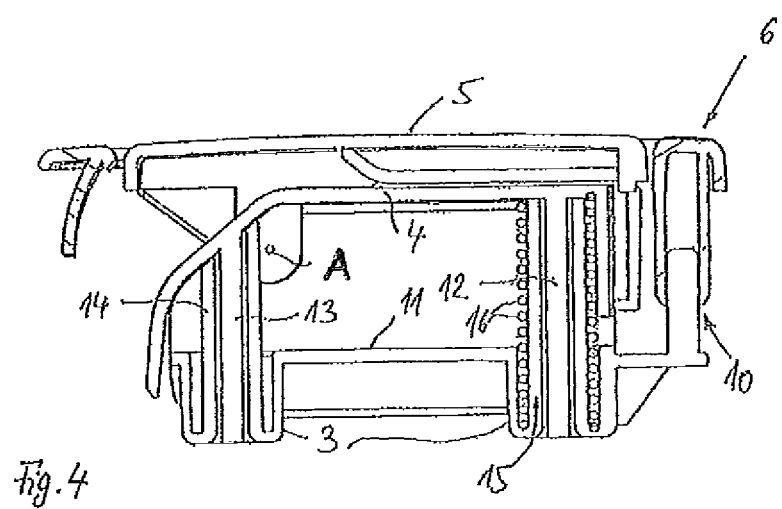
FIG. 4 shows the receiving device according to FIGS. 2 and 3 in a sectional illustration with the cover closed.

In order to push the holding frame 4 from its upwardly extended functional position according to FIGS. 1, 3 and 5 into the receiving space of the receiving region 3 again, the cover 5 is pivoted in a simple manner from its open release position in the direction of its closed position again. In the process, the at least one control cam 8 on the lower side of the cover 5 pushes against the oblique control surface 9 of the holding frame 4, as a result of which the at least one control cam 8 inevitably forces the control surface 9 downward during a pivoting movement of the cover 5 in the direction of its closed position. By this means, the holding frame 4 is pushed downward counter to the compressive force of the lifting spring arrangement 16 until the cover 5 has reached its closed position according to FIGS. 2 and 4. When the closed position 5 is reached, the locking unit 6, 7, 10 latches, preferably automatically, such that the cover 5 is secured and remains locked in its closed position. An inner side of the cover 5 has web or wall sections which are not denoted specifically in FIGS. 4 and 5. Said web or wall sections keep the holding frame 4 in its lower rest position counter to the compressive force of the lifting spring arrangement 16 by resting flat on the upper side of the holding frame 4. The permanent compressive force of the lifting spring arrangement 16 at the same time ensures freedom from rattling, since, when the cover 5 is closed, the holding frame 4 remains in a pretensioned position.

Alternatively, it is possible directly to secure the holding frame 4 in its rest position or to release it from said rest position by means of the locking units 6, 7, 10. In this embodiment, the cover 5 does not have any direct restraining function for the holding frame 4, but rather serves merely for closing the receiving opening of the receiving region 3.

Figure 6:
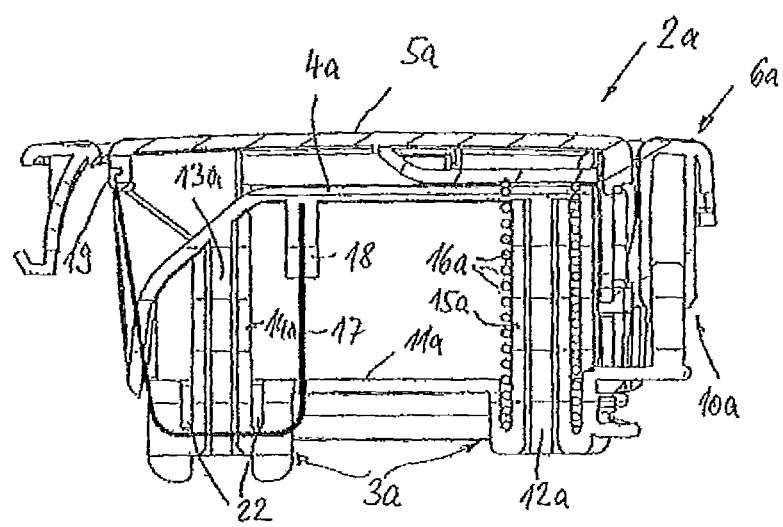
FIG. 6 shows a further embodiment of a receiving device according to the invention similar to the embodiment according to FIGS. 1 to 5 in a sectional illustration with the cover closed.
Figure 7:
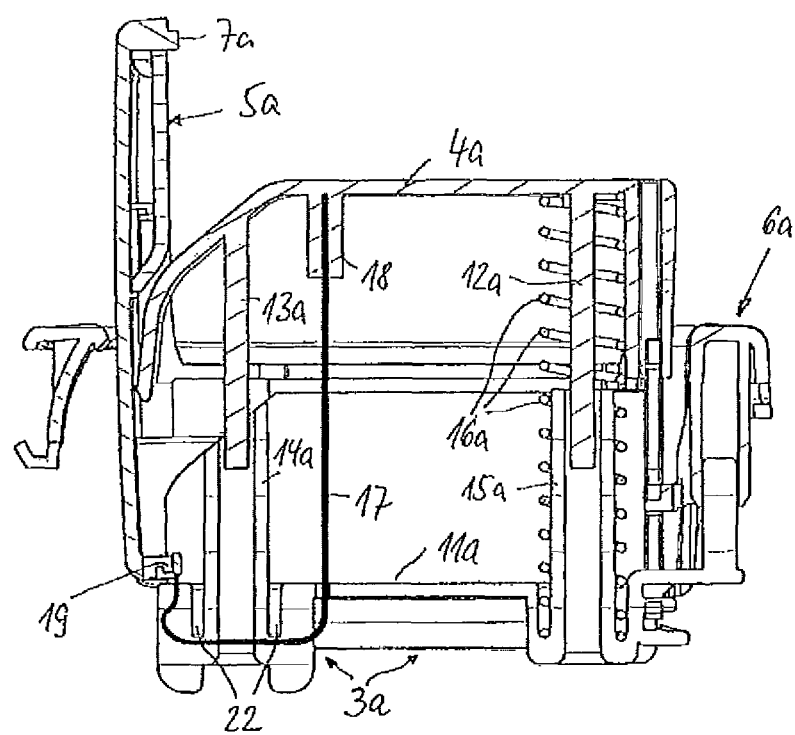
FIG. 7 shows the receiving device according to FIG. 6 with the cover open.
Figure 10:
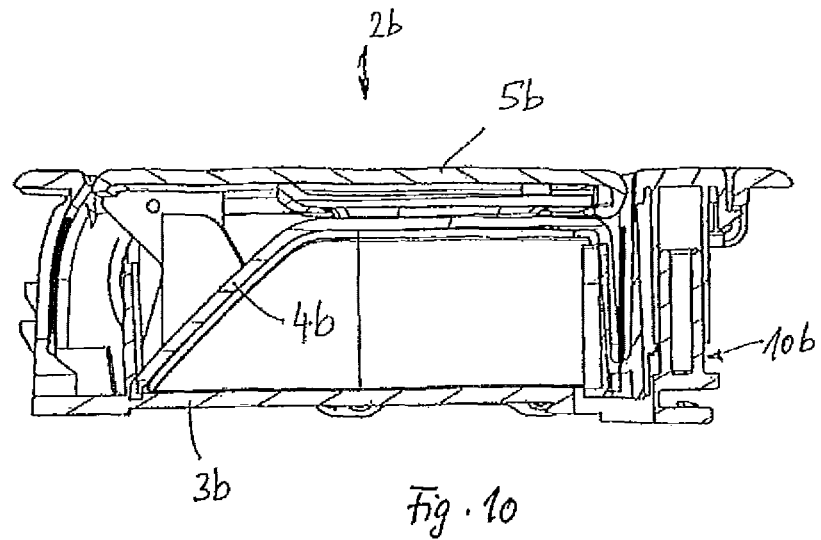
FIG. 10 shows a sectional illustration of the receiving device according to FIG. 8.
Figure 11:
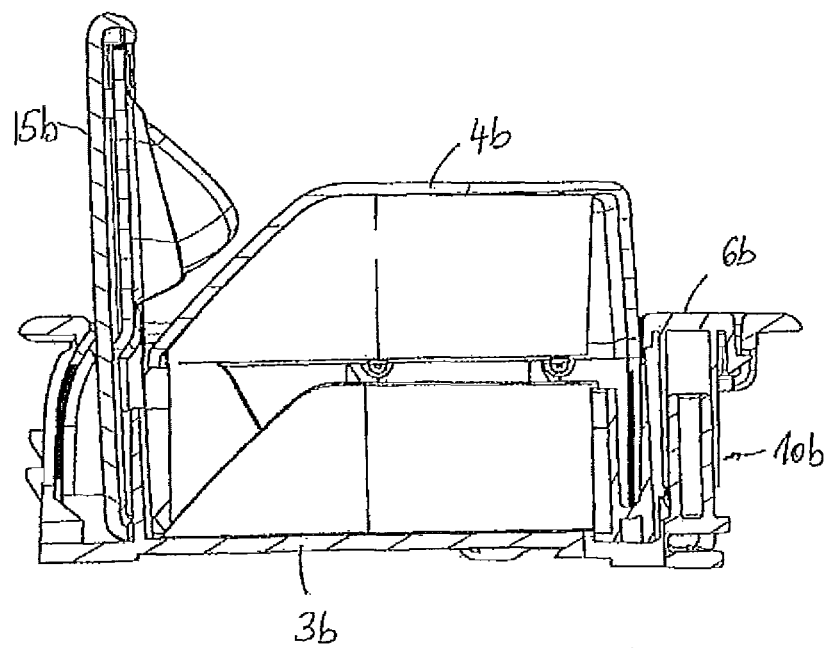
FIG. 11 shows a sectional illustration of the receiving device according to FIG. 9.

The embodiment according to FIGS. 6 and 7 substantially corresponds to the embodiment described previously with reference to FIGS. 1 to 5. In order to avoid repetitions, reference is made to the disclosure of the description and the drawings for the exemplary embodiment according to FIGS. 1 to 5. Functionally or structurally identical parts and sections of the receiving device 2a according to FIGS. 6 and 7 are provided with the same reference numbers with the addition of the letter a. Reference is made below to the decisive differences of the receiving device 2a according to FIGS. 6 and 7 in relation to the receiving device 2 according to FIGS. 1 to 5.

An essential difference in the receiving device 2a according to FIGS. 6 and 7 is that a positive guide for coupling the movement of the holding frame 4a to the cover 5a is formed there by at least one tension means in the form of a tension cable 17. The tension cable 17 is supplied from below to the holding region 4a and is fastened by an end region to the holding frame 4a at a holding section 18. An opposite end region of the tension cable 17 is fastened to a side border 19 of the cover 5a. The tension cable 17 is deflected within the receiving region 3a via deflecting webs 22 on a base region of the receiving region 3a in order to make it possible for the tension cable 17 to engage on the holding frame 4a from below. This ensures that a tensile force can be applied downward on the holding frame 4a by the tension cable 17 counter to the lifting force of the lifting spring arrangement 16a, as a result of which the holding frame 4a can be transferred from its functional position according to FIG. 7 into the lowered rest position according to FIG. 6 counter to the compressive force of the lifting spring arrangement 16a. Length, course and deflection of the tension cable 17 are selected in such a manner that, during a pivoting movement of the cover 5a downward, the holding frame 4a is inevitably pulled downward out of its functional position according to FIG. 7. A plurality of tension means arranged distributed over the width of the holding frame 4a and in the form of tension cables 17 or the like can be provided, said tension means being coordinated with one another in such a manner that they exert a parallel tensile force loading on the holding frame 4a.

In its closed position, the cover 5a, in addition or alternatively to the tensile force applied to the holding frame 4a via the at least one tension cable 17, can exert pressure from above via a corresponding web or wall section in the region of the inner side of the cover 5a. The cover 5a is secured in a manually releasable manner in the closed position by means of a locking unit 6a, 7a, 10a in the same manner as is the case in the embodiment according to FIGS. 1 to 5.

The receiving devices 2b and 2c according to FIGS. 8 to 31 are positioned in a vehicle interior in the same manner as has been described previously with reference to the receiving device 2 according to FIG. 1. Functionally identical parts of the receiving devices 2b and 2c of the receiving devices 2b and 2c are provided with the same reference numbers with the addition of the letters b and c. Functionally identical sections or parts between the receiving devices 2b and 2c are likewise provided with the same reference numbers, but with the addition of a prime '.

Essential differences of the receiving devices 2b and 2c in relation to the previously described receiving devices according to FIGS. 1 to 7 include the fact that, in order to couple the pivoting movements of the covers 5b and 5c to a movement of the holding frames 4b, 4c, additional control bodies S, S' are provided which are in each case mounted on opposite sides of the receiving region 3b, 3c in pairs and so as to be movable in a synchronized manner to each other. The control bodies S, S' for controlling the movements of the holding frame 4b, 4c and of the cover 5b, 5c are moved here in directions which differ from the lifting direction of the respective holding frame 4b, 4c. The control bodies S, S' are guided and are mounted movably on the respective receiving region 3b, 3c. In order to guide the control bodies S, S' relative to the respective receiving region 3b, 3c, guide profilings in the form of slotted guides, link pins or guide webs and guide grooves, which are described in more detail below, are provided. In both receiving devices 2b and 2c, the respective cover 5b, 5c is lockable and releasable by a locking unit 6b, 10b; 6c, 10c which functionally corresponds to the locking unit 6, 10 according to the previously described embodiments. In order to avoid repetitions, reference is therefore made with respect to said locking units 6b, 10b to the disclosure for FIGS. 1 to 7.

The control bodies S, S' described in more detail below are assigned damping units, preferably in the form of silicone brakes, which damp the movements of the control bodies S, S' relative to the receiving region. A receptacle 26 for a corresponding silicone brake and an associated toothed rack guide 27 for the control body S are illustrated schematically with reference to FIGS. 12 and 13. The control bodies S' are also provided with similar damping units. This is indicated with reference to the toothed rack guide 27' according to FIGS. 24 to 31. Since the two control bodies S, S' on opposite sides of the respective receiving region 3b, 3c are in each case coupled to the respectively single, common cover 5b, 5c, they are inevitably moved in a synchronized manner to each other depending on the movement of the cover 5b, 5c.

Figure 24:
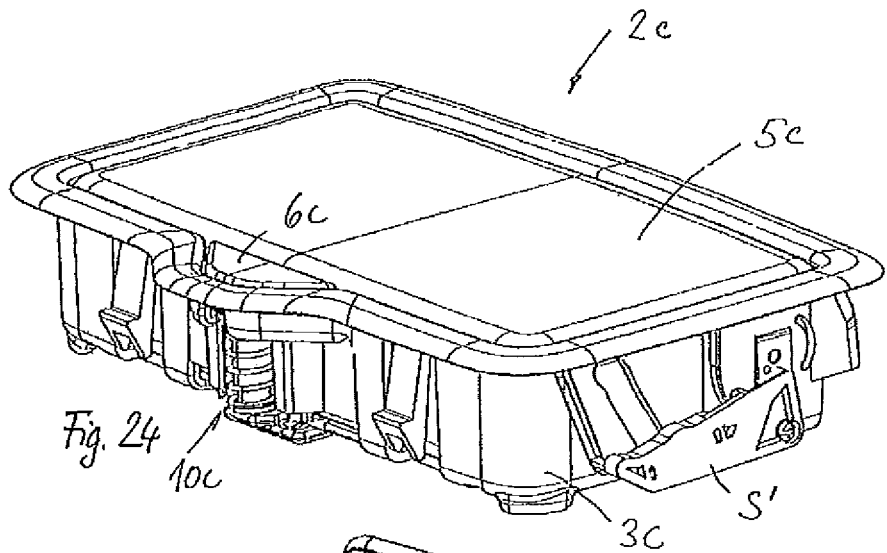
FIG. 24 shows a further embodiment of a receiving device according to the invention in the closed rest position.
Figure 25:
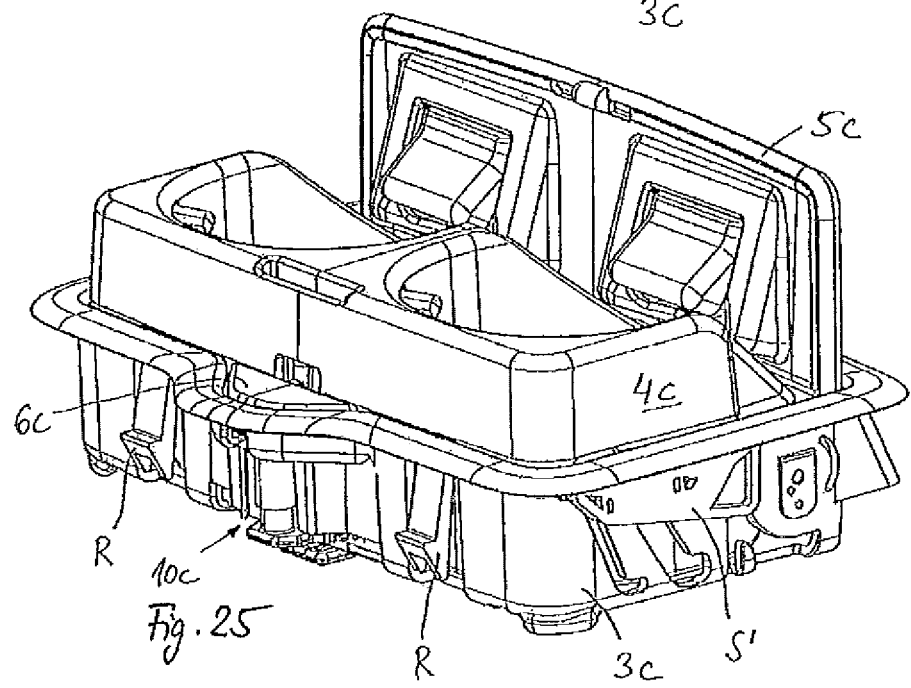
FIG. 25 shows the receiving device according to FIG. 24 in the open functional position.
Figure 26:
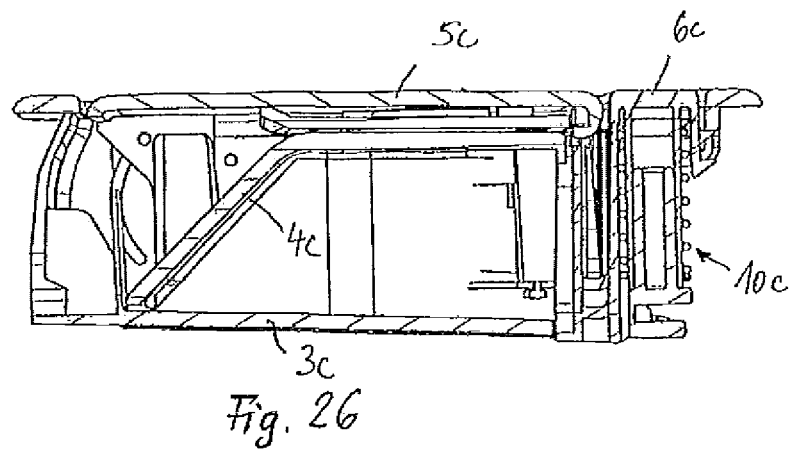
FIG. 26 shows a sectional illustration of the receiving device according to FIG. 24.
Figure 27:
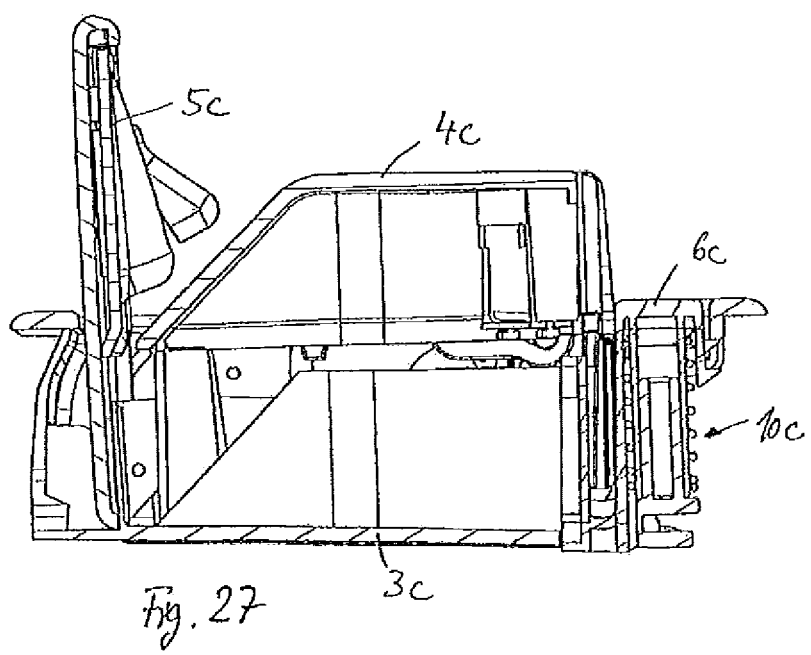
FIG. 27 shows a sectional illustration of the receiving device in the position according to FIG. 25.
Figure 28:
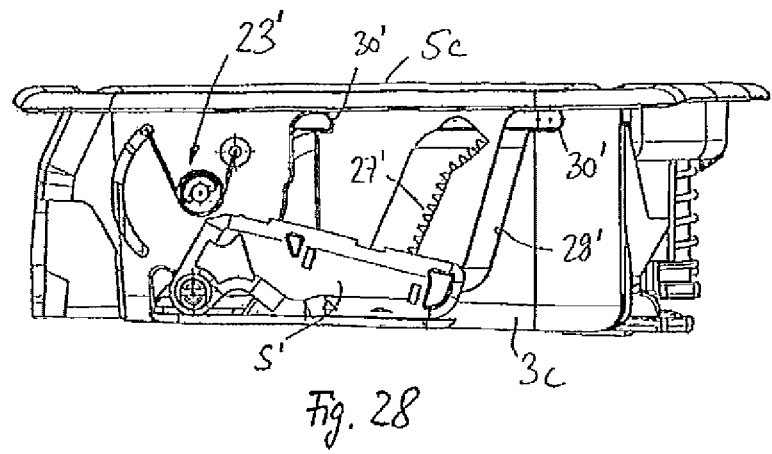
FIG. 28 shows a side view of the receiving device according to FIG. 24.
Figure 29:
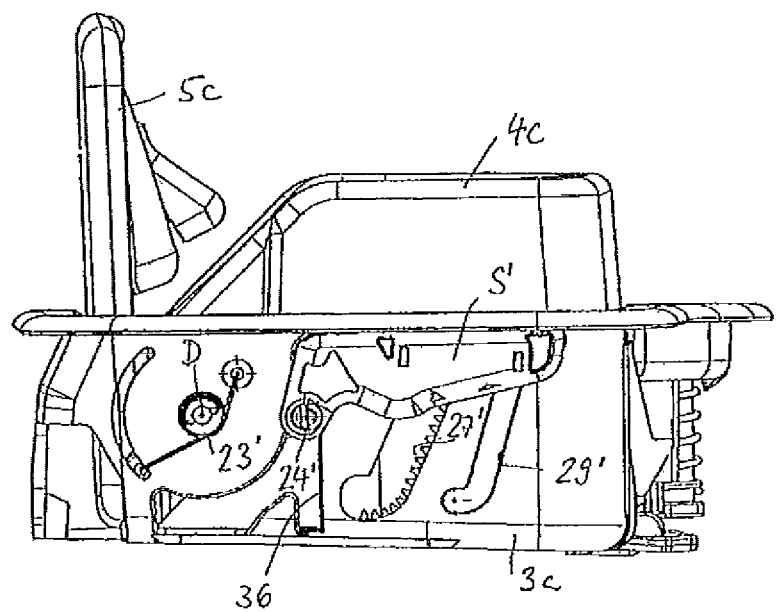
FIG. 29 shows a side view of the receiving device in the position according to FIG. 25.

In both embodiments, the cover 5b, 5c is mounted on the opposite sides of the receiving region 3b, 3c so as to be rotatable about a pivot axis D via a respective pivot lever 25, 25'. On both sides, the respective cover 5b, 5c is in each case assigned a leg spring 23, 23' which subjects the cover 5b, 5c to torque in the opening direction. In both embodiments, a pivoting movement of the cover 5b, 5c is limited by a stop pin which projects into a slotted guide in the shape of a circular arc and is integral with the respective cover 5b, 5c. The slotted guide is provided in the respective side of the receiving region 3b, 3c and is formed coaxially in the shape of a circular arc with respect to the axis of rotation D (slotted guide 39 and stop pin 40 for the receiving device 2c in FIG. 31). In the open functional position, the cover 5b, 5c is oriented at right angles to its closed position (FIG. 8, FIG. 24). To close the cover 5b, 5c from said standing-open functional position, pressure is exerted manually on the cover 5b, 5c, the pressure overcoming the opposite directed spring force of the leg springs 23, 23' and returning the cover 5b, 5c into the closed position in which said cover is secured by the locking unit 6b, 10b; 6c, 10c.

The two receiving regions 3b, 3c are provided with elastically flexible latching webs R for latching into a corresponding frame section of the central arm rest 1. This makes it possible to fasten the respective receiving device 2b, 2c in the corresponding frame section of the vehicle interior without using a tool.

By means of the control bodies S, S', the holding frames 4b, 4c in the two receiving devices 2b, 2c are shifted in a lifting manner from a lower rest position into an upper end position and are subsequently shifted transversely forward away from the cover 5b, 5c by a small amount at right angles to the lifting movement. This limited transverse shifting path of the holding frames 4b, 4c in the two receiving devices 2b, 2c ensures that the respective holding frame 4b, 4c is supported in an interlocking manner against being pressed downward. The support is self-locking, and therefore a pressure on the holding frame 4b, 4c from above in the extended functional position cannot result in any movement of the holding frame 4b, 4c downward. On the contrary, the holding frame 4b, 4c first of all has to reverse the transverse shifting path again by corresponding pivoting of the cover 5b, 5c and associated positive coupling via the control bodies S, S' before the respective holding frame 4b, 4c can be lowered.

In the case of the receiving device 2b according to FIGS. 8 to 23, the two opposite control bodies S are mounted on the receiving region 3b in a linearly movable manner transversely with respect to the lifting direction of movement of the holding frame 4b. For this purpose, guide webs 32 are provided on the receiving region 3b and are assigned associated guide grooves 33 on the respective control body S, which guide grooves are arranged and oriented in a complementary manner to the guide webs 32 on the control body S. Each supporting lever 25 of the cover 5b has a lever extension which protrudes from the axis of rotation D and is mounted by means of a link pin 24 in a linear slotted guide 31 of the control body 8, which slotted guide is oriented in the vertical direction.

The holding frame 4b is vertically displaceable on its opposite sides by means of in each case two bearing points 28, which are spaced apart horizontally from each other, in approximately vertically running guide profilings 29 of the respective side of the receiving region 3b. The upper end regions of the guide profilings 29 have two slot expansions 30 which protrude away in the same direction horizontally and serve to shift the bearing points 28 of the holding frame 4b transversely away from the cover 5b in the upper lifting position of the holding frame 4b.

Figure 21:
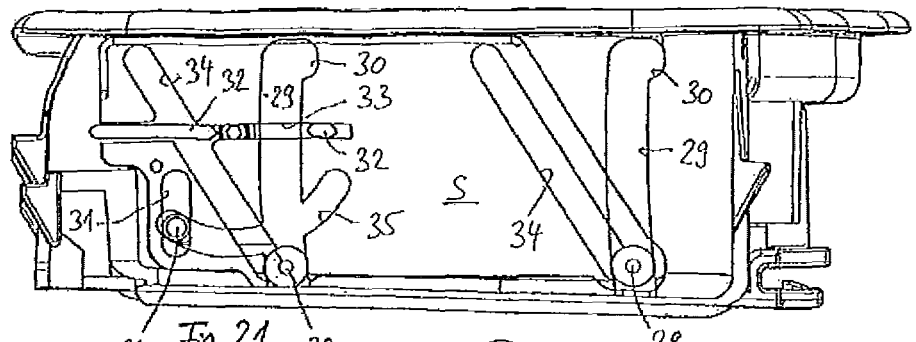
Figure 22:
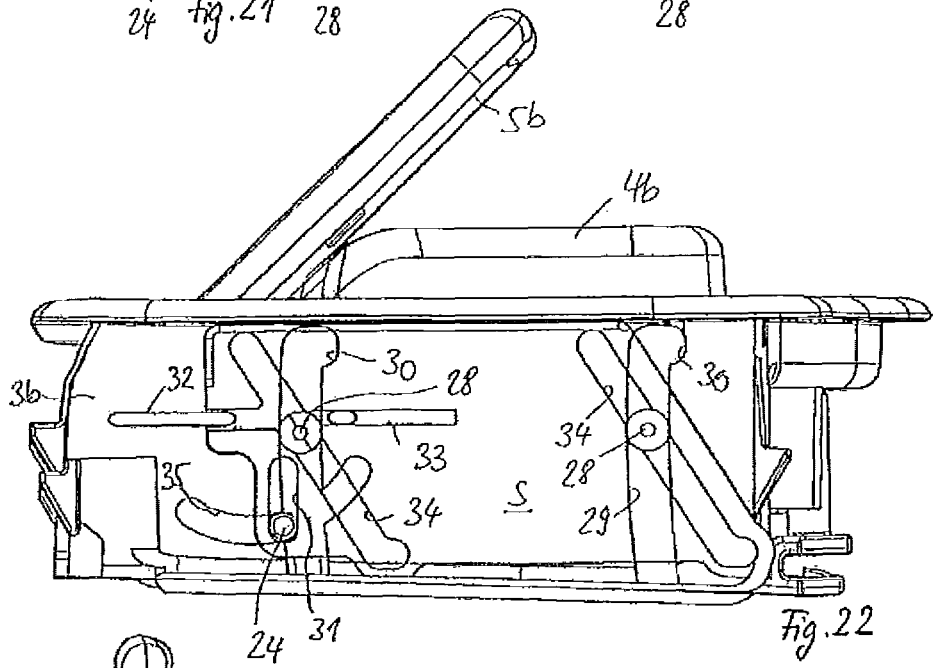
Figure 23:
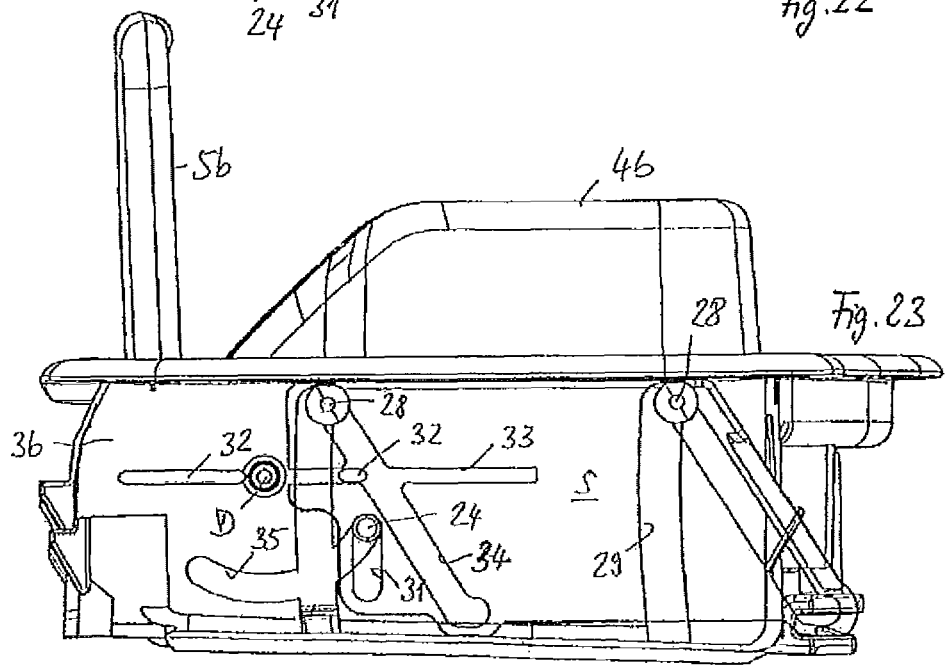

The control bodies S are coupled to the cover 5b via the link pin 24 which engages in the respective vertical slotted guide 31 of the respective control body S and, on the receiving region, is also guided in a slotted groove 35 which is in the shape of a circular arc and is oriented coaxially with respect to the axis of rotation D (see in particular FIGS. 21 to 23). As a result, a pivoting movement of the cover 5b inevitably results in a horizontal displacement of the respective control body S along the guide webs 32 and therefore parallel to an upper border edge of the receiving region 3b. In order to convert said displacement movement of the control body S into a lifting movement of the holding frame 4b upward or downward, each control body S is provided with two guide profilings 34 which run parallel to each other and are oriented obliquely with respect to the shifting direction of the control body S. Said guide profilings are oriented at an angle of approximately 60° to the horizontal and, accordingly, approximately at an angle of approximately 30° to the vertical. The bearing points 28 of the holding frame 4b are mounted displaceably in the guide profilings 34 and are also guided in the vertical guide profilings 29 of the receiving region 3b. The guide profilings 34 and 29 accordingly intersect. By means of the oblique orientation of the guide profilings 34, a horizontal shifting movement of the respective control body S inevitably brings about a displacement of the bearing points 28 along the guide profilings 34 and, accordingly, a lifting movement upward or downward along the guide profilings 29. When the upper lifting position of the bearing points 28 in the guide profilings 29 is reached, the pivoting movement of the cover 5b in the direction of its open end position is not yet brought to an end. Accordingly, the remaining pivoting movement of the cover 5b as far as the vertically open end position results, in the upper lifting position of the guide profilings 29, in the link pins 24 the control bodies S still pushing the bearing points 28 by a small amount in the transverse direction, as a result of which the bearing points 28 are moved into the slot extensions 30 away from the cover in the direction of the locking unit 6b, 10b. By this means, the holding frame 4b is inevitably shifted at the same time in the transverse direction. This ensures a self-locking support of the holding frame 4b downward in the vertical direction. The holding frame 4b is blocked in its extended functional position against being lowered downward. When the cover 5b is closed, the bearing points 28 are first of all pulled back again out of the horizontal slot extensions 30 before the holding frame 4b can be lowered. Accordingly, the holding frame 4b, on release from its upper functional position, also first of all makes a slight horizontal movement again in the direction of the cover 5b before the lowering movement begins.

With regard to the receiving device 2c according to FIGS. 24 to 31, only the differences in relation to the receiving device 2b according to FIGS. 8 to 23 are discussed below. Otherwise, what has been previously stated with regard to the receiving device 2b applies equally to the receiving device 2c.

Figure 30:
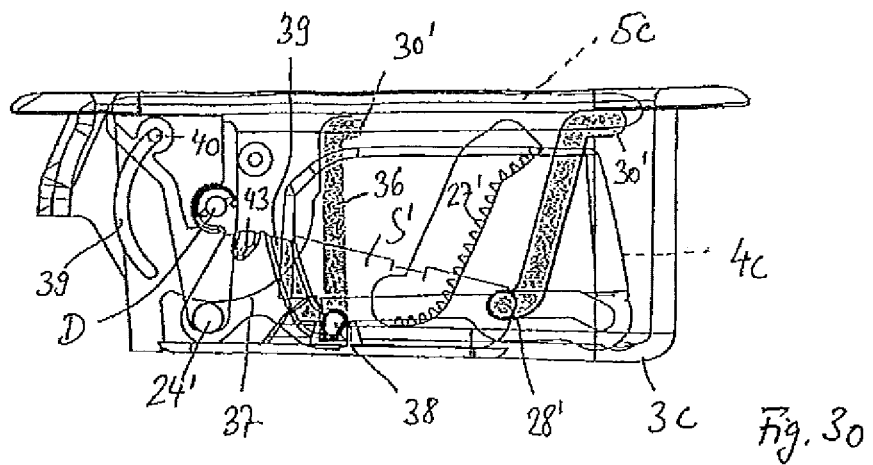
FIG. 30 shows schematically the receiving device according to FIG. 28 with an illustration of visible and invisible lines of guide profilings of a control body, a receiving region and the holding frame.
Figure 31:
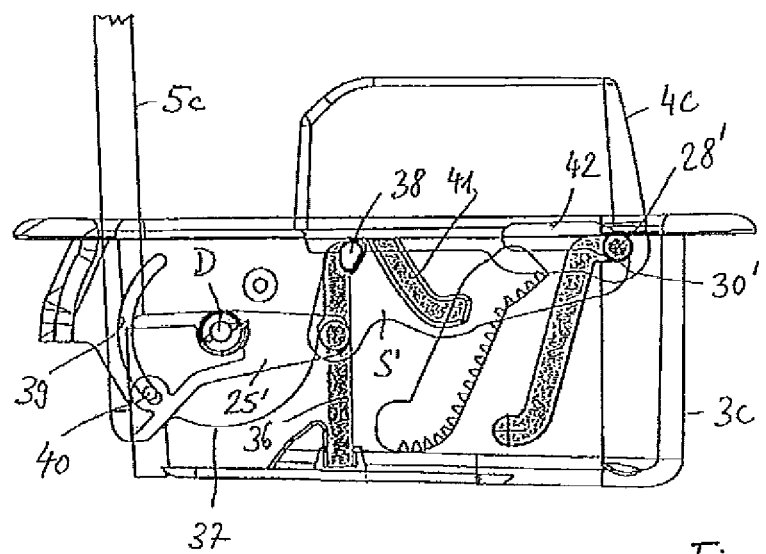
FIG. 31 shows schematically an illustration similar to FIG. 30, but in the open functional position.

The receiving device 2c according to FIGS. 24 to 31 has, on each side of the receiving region 3c, a respective control body S' which is mounted movably along a curved path on the respective side of the receiving region 3c obliquely with respect to a lifting direction of the holding frame 4c. The holding frame 4c is provided, in the region of each control body S', with a rear bearing pin 38 which faces the axis of rotation D of the cover 5c and is guided in a liftable manner in a vertical slotted guide 36 of the receiving region 3c. A front bearing pin 28' of the holding frame 4c is not mounted in a stationary manner with respect to the holding frame 4c, like the bearing pin 38, but rather is mounted displaceably in a slotted guide 42 of the holding frame 4c. The slotted guide 42 is provided integrally on the side of the holding frame 4c. The guide pin 28' is firstly guided in said slotted guide 42 and secondly in a slotted guide 29', which runs obliquely in an S-like manner, on the receiving region 3c. In addition, the bearing pin 28' is held on the outer side on the control body S'. The upper end region of the slotted guide 29' is provided with a horizontal slot extension 30' which, in an upper lifting position of the holding frame 4c, brings about a transverse shifting of the holding frame 4c analogously to the holding frame 4b according to FIGS. 8 to 23. In addition, a curved path 41 for guiding the rear bearing pin 38 is provided in the control body S'. In addition, the control body S' is provided with a supporting pocket 43, into which the bearing pin 38 enters in the upper lifting position of the holding frame 4c and thus brings about a necessary support for the upper end position, in which the bearing pin 28' is moved into the slot extension 30' of the slotted guide 29'. By means of the control kinematics defined by the control body S' and the previously described guide profilings, the holding frame 4c first of all carries out a lifting movement upward before, analogously to the holding frame 4b, in the upper lifting position the transverse shifting, which is limited to a short path, forward relative to the receiving region 3c takes place. Depending on the design of the guide profilings of the control kinematics, the holding frame 4c, during its transfer into the upper end position or the lower end position, can in the meantime also carry out short-range tilting movements. In particular, a release of the holding frame 4c from the upper functional position according to FIG. 31 is brought about by the cover 5c being moved again in the direction of its closed position. As a result, the lever extension 25' of the supporting lever of the cover 5c pivots the control body S' downward, wherein the bearing pin 38 serving as the supporting pin comes free from the receiving pocket 43 of the control body S' and enters the slotted path 41 of the control body S' again. At the same time, the bearing pin 28' serving as the bearing point is also pulled out of the slot extension 30' of the oblique slotted track 29' and lowered together with the control body S'. When a lower position of the guide track 29' is reached, the bearing pin 28' is introduced into the lower, horizontally rearwardly protruding end region of the guide track 29', as a result of which the lower end position of the control body S' according to FIG. 30 is reached.

The invention claimed is:

1. A receiving device for at least one bottle or cup container in a vehicle interior, the receiving device including a receiving region, a holding frame mounted liftably relative to the receiving region, and a cover articulated on the receiving region for closing and opening up the receiving region, the cover and the holding frame being coupled to each other over at least part of their movement path by a positive guide, the positive guide having a control mechanism mounted on the receiving region and coupled to the cover and to the holding frame so as to transmit movement, the receiving device further including a guide mechanism for liftable shifting of the holding frame relative to the receiving region, the guide mechanism comprising, at an upper end region, a transverse guide limited to a short path, the transverse guide transversely shifting the holding frame away from the cover, after the holding frame has reached an upper end position, into an extended functional position.

2. The receiving device as claimed in claim 1, wherein the control mechanism comprises at least one control body guided on the receiving region, the control body being shiftable relative to the receiving region and coupled to the holding frame.

3. The receiving device as claimed in claim 2, wherein a direction of movement of the control body differs from a lifting direction of movement of the holding frame.

4. The receiving device as claimed in claim 3, wherein the control body is mounted movably on the receiving region transversely or obliquely with respect to the lifting direction of movement of the holding frame.

5. The receiving device as claimed in claim 2, the receiving device further including a damping unit for damping shifting movements of the control body.

6. A receiving device for at least one bottle or cup container in a vehicle interior, the receiving device including a receiving region, a holding frame mounted liftably relative to the receiving region, and a cover articulated on the receiving region for closing and opening up the receiving region, the cover and the holding frame being coupled to each other over at least part of their movement path by a positive guide, wherein the holding frame is acted upon upward in a lifting direction by a lifting drive in the form of a lifting spring arrangement, the positive guide being configured such that, during a closing movement of the cover, the holding frame is transferrable from an upper holding position into a lower rest position, the receiving device further including a releasable locking arrangement which locks the cover in a closed position, the positive guide comprising at least one tension element connecting the holding frame to the cover so as to transmit movement.

* * * * *